United States Patent [19]

Gyger

[11] Patent Number: 5,407,058
[45] Date of Patent: Apr. 18, 1995

[54] CHAIN CONVEYOR WITH FRICTIONALLY DRIVEN RECIRCULATED PALLETS LINKED TOGETHER IN SUB GROUPINGS

[75] Inventor: Jack D. Gyger, Charlotte, Mich.

[73] Assignee: Roberts-Sinto Corporation, Lansing, Mich.

[21] Appl. No.: 219,976

[22] Filed: Mar. 29, 1994

Related U.S. Application Data

[63] Continuation-in-part of Ser. No. 49,343, Apr. 21, 1993.

[51] Int. Cl.$^6$ ............................................. B65G 37/00
[52] U.S. Cl. ................................. 198/465.3; 198/803.2
[58] Field of Search ............... 198/465.3, 803.2, 465.1, 198/803.01, 465.4

[56] References Cited

U.S. PATENT DOCUMENTS

| | | | |
|---|---|---|---|
| 4,088,220 | 5/1978 | Jackson et al. | 198/465.3 X |
| 4,896,763 | 1/1990 | Hordyk et al. | 198/465.3 X |
| 5,178,261 | 1/1993 | Matheson et al. | 198/465.3 X |
| 5,226,524 | 7/1993 | Guttinger et al. | 198/803.01 |
| 5,261,523 | 11/1993 | Gasior et al. | 198/465.3 |
| 5,282,529 | 2/1994 | Schwammle | 198/465.3 |

*Primary Examiner*—Cheryl L. Gastineau
*Attorney, Agent, or Firm*—John R. Benefiel

[57] ABSTRACT

A chain conveyor is described having a pair of loops of triple strand chains, frictionally driving pallets supported on upper advance runs, the pallets linked together in subgroups to be able to support long length workpieces. The pallets are driven around the chain loop sprockets at either end of the conveyor, the linked connection allowing relative tilting of the pallets in the subgroup as each subgroup is driven around the sprocket axes. The pallets are held as they are swung around either sprocket axis by a split disc gripper mechanisms which each grip a tapered edge gripper bar mounted spaced below the pallet. A pair of ride bars are also mounted below the pallet, each having a rounded shoulder at either end engaging a chain loop across the inside curvature of the chain loop when passing around the sprockets. The rounded shoulders nonpositively engage the chain link rollers so that the pallets are not positively fixed to the chain loops when swung around the sprocket axis at either end. An overhead form of the conveyor has workpiece hangers depending from each pallet during movement down the lower run, with workpiece suspended therefrom, the upper run being the return run in that embodiment.

13 Claims, 8 Drawing Sheets

CHAIN CONVEYOR WITH FRICTIONALLY DRIVEN RECIRCULATED PALLETS LINKED TOGETHER IN SUB GROUPINGS

CROSS REFERENCE TO RELATED APPLICATIONS

This application is a continuation-in-part of U.S. Ser. No. 08/049,343, filed on Apr. 21, 1993.

BACKGROUND OF THE INVENTION

1. Field of the Invention

This invention concerns conveyors, and more particularly endless chain conveyors which frictionally drive pallets resting on the advance runs of a pair of endless loops of triple link chains and recirculate the pallets by swinging the pallets around each curved end of the conveyor to invert the pallets onto a lower return run of the chain loops and swinging the pallets up around the other end and back onto the advance runs.

2. Description of the Prior Art

Some of the prior conveyors included an arrangement for wedging the pallets to the chains to drive them around either curved end. In other prior arrangements toothed discs engaged the pallets which were guided along curved tracks. The wedging action relied on in some of those prior conveyors could lead to wear of the chain and engaging portions of the pallet.

The prior recirculating pallet conveyors have been limited in the size of the workpieces that could be handled, since the pallets were limited in size by the need to be swung around the conveyor ends in being recirculated.

In copending application, U.S. Ser. No. 08/049,343 filed on Apr. 21, 1993, there is described a conveyor of this type.

In that application, a pair of pallet drive discs are provided, one on each chain sprocket. The discs have a series of pockets provided about their perimeters. The pallets in turn have a pair of longitudinally spaced rollers on each side mounted beneath the pallet platform. These rollers pass into each pocket as the discs rotate, the triple strand chain having middle links wrapping over radiused corner pallet guide bars to retain the rollers fully seated in the pockets and hold the pallet in position as the pallet becomes inverted by being swung down by the disc rotation.

As the triple strand chains unwrap off the discs at the bottom of the disc, the pallets move onto the return run of the chains, and are carried to the end of the conveyor where they encounter a similar pair of pocketed discs. These discs similarly capture the pallet rollers so that the pallet is swung back up to the upper return chain runs for repeat movement along the advance run.

This arrangement does not require wedging to the chains nor a separate guide track. However, it does require the pallets to be properly positioned to allow the lead roller to enter a disc pocket as the disc rotates to bring a pocket into a position aligned with the roller.

If the lead roller on each side does not reach the disc when a pocket moves into proper alignment to receive a lead roller, the roller impacts the outer disc surface and the pallet movement is arrested until a pocket does move into alignment. However, if the pallets are heavily loaded and/or the conveyor is operated at high speed, the rollers instead of stopping may instead ascend the disc outer perimeter to wedge the pallet against the chains.

To avoid this, a controlled stop arrangement is described in the aforementioned U.S. patent application which holds each pallet until a pocket on each disc moves into proper position. Such control increases the complexity of the conveyor and requires proper set up and maintenance. There is also some possibility that a pallet will still not arrive at the right moment due to some slippage, on the chains or some other local condition unless the control stop is very close to the disc.

A disadvantage of many of the prior conveyors of this type as well as the conveyor design described in copending application Ser. No. 08/049,343 is that the pallets are positively driven at the curved ends of the conveyor. If the pallets encounter an obstruction, damage to the pallet, the obstruction, or other conveyor components would likely occur.

Accordingly, it is an object of the present invention described to overcome the limitations of part size imposed by the limited size of the pallets which may be driven around the curved ends of this type conveyor.

It is another object of the present invention to provide an improved chain conveyor of the type described which does not require a controlled stop arrangement nor involve a coordinating of the pallet position with the rotative position of the pallet drive discs used to swing the pallets around the sprocket axis at each end of the conveyor.

It is still a further object of the present invention to provide a friction driving of the pallets around the curved ends of the conveyor which is not positive so as to allow slippage if the pallet encounters an obstruction.

SUMMARY OF THE INVENTION

The above objects, as well as others which will become apparent upon a reading of the following specification and claims is achieved by a linked pallet arrangement, in which sub groups of two or more pallets are connected together to form a combined workpiece relatively long length supporting surface which is of greater length than that of a single pallet while being able to be driven around the curved ends by allowing the individual pallets in each sub group to tip relative each other.

The pallets may be linked by pairs of link bars or other linking elements extending between linked pallets. The link bars are able to pivot at each end to allow the pallets in each subgroup to tip relative each other when passing around the curved conveyor ends.

The pallets are driven around the curved ends of the conveyor by return means including at least one spring loaded split disc gripper mechanism at each end of the conveyor. The gripper mechanisms are driven with chain sprockets on each side of the conveyor. The chain sprockets also drive a pair of triple link conveyor chain loops on which the pallets rest to be frictionally advanced along the conveyor.

Each pallet has at least one tapered gripper bar mounted beneath a workpiece supporting platform, the gripper bar aligned with the split disc gripper mechanism when the pallet is being advanced atop the advancing run of the conveyor. As each pallet reaches the end of the conveyor advance run, the tapered edge of the gripper bar is received in a complementarily tapered perimeter groove formed by the perimeter shape of the discs included in the gripper disc mechanism. The discs are thereby spread apart against a spring resistance so that the gripper bar is gripped between the discs.

Rotation of the slightly spread discs lifts the pallet off the top of the chains and carries it forward to cause a rounded shoulder at one end of each of a pair of ride bars to engage cantilevered inner links of the associated chain loops. As the pallet is swung around the disc sprocket axis, a shoulder at the opposite end of each ride bar also engages the inside of the inner links, the ride bars extending chordally across the inner curvature of the chain loops as they pass around their associated sprockets. This engagement guides the pallet by the confinement imposed by the curving radius of the chain loops as it is swung about the sprocket axis by the split disc gripper mechanism rotation, holding it normal to the sprocket axis. However, this engagement does not positively fix the pallet to the chain loops.

After being swung half way around the sprocket disc axis to be inverted thereby, the pallet ride bars continue to support the inverted pallet on the return run of the chain loops, the ride bars lowered onto the inner links of the return run of each chain. The gripper bar is smoothly pulled out of the split disc gripper mechanism as the perimeter of the disc rotates upwardly and away from the inverted pallet with its full weight then resting on the inner links of the return run of each of the chain loops.

As the gripper bar of each inverted pallet encounters the split disc gripper mechanism at the opposite end of the conveyor, the leading end of the gripper bar is again moved between the tapered disc pair of the split disc gripper assembly to be gripped and swung up by the disc rotation. The shoulders at either end of the ride bars again engage the inner links of the respective associated chain loops, so that the pallet is positioned against the chain loops as it is gripped to be swung around by the disc gripper mechanism rotation. The pallet is rotated until the leading end of each of a pair of support bars engages the middle link of its associated chain loop, continued downward disc rotation stripping the gripper bar from the gripper mechanism allowing frictional engagement of the support bars with the center links of the chain to again advance the pallet down the chain loop advance runs, riding on the center links.

A pair of split disc gripper mechanisms are preferably provided at each end of the conveyor to increase the gripping force available. In this instance, the gripper bars are preferably formed by an integral parallel edge portion of each rider bar.

Each split disc gripper mechanism comprises a pair of separate discs mounted to a sprocket wheel by a series of bolts, each disc axially slidable on the bolts to a limited extent to be spread apart against the bias of sets of compression springs urging the discs towards each other to reduce the width of the tapered perimeter groove to a fully contracted state. The tapered gripper bar is wider to force the discs to be spread apart and thereby establishing a gripping force on the sides of the gripper bar. Axially extending portions on at least one of the discs and the gripper bar are engaged at a predetermined point to limit spreading movement of the discs.

Since the gripper bars on each pallet may engage the split disc gripper mechanism at any point, there is no need to control the timing of the pallet movement into the discs, and the absence of specific engagement features eliminates any need for the linked pallets in a group to be spaced a critical distance apart.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
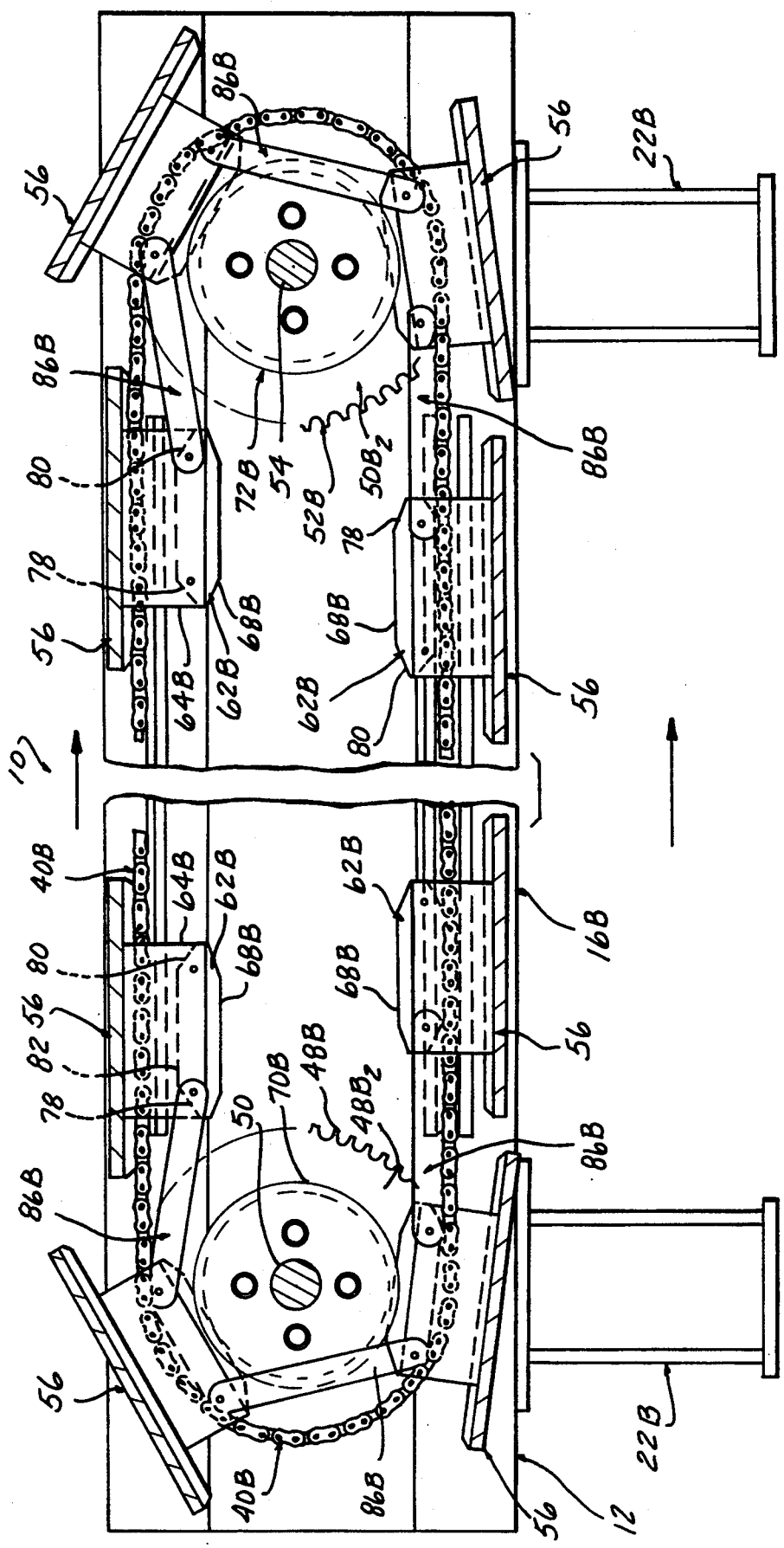
FIG. 1 is a side elevational view of the longitudinal section 1—1 through a conveyor according to the present invention shown in FIG. 2, depicting a connected series of pallets being driven around the chain sprocket axes at either end of the conveyor.
Figure 3:
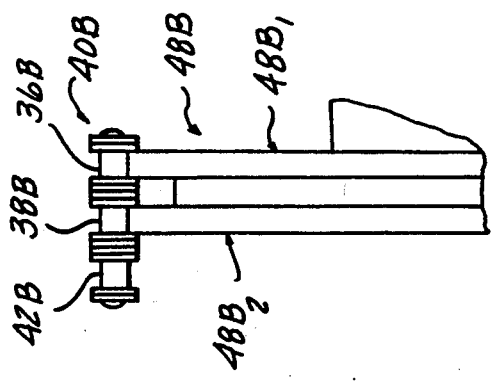
FIG. 3 is a fragmentary view of a double sprocket engaging one of the triple strand chain loops included in the conveyor shown in FIGS. 1 and 2.
Figure 2:
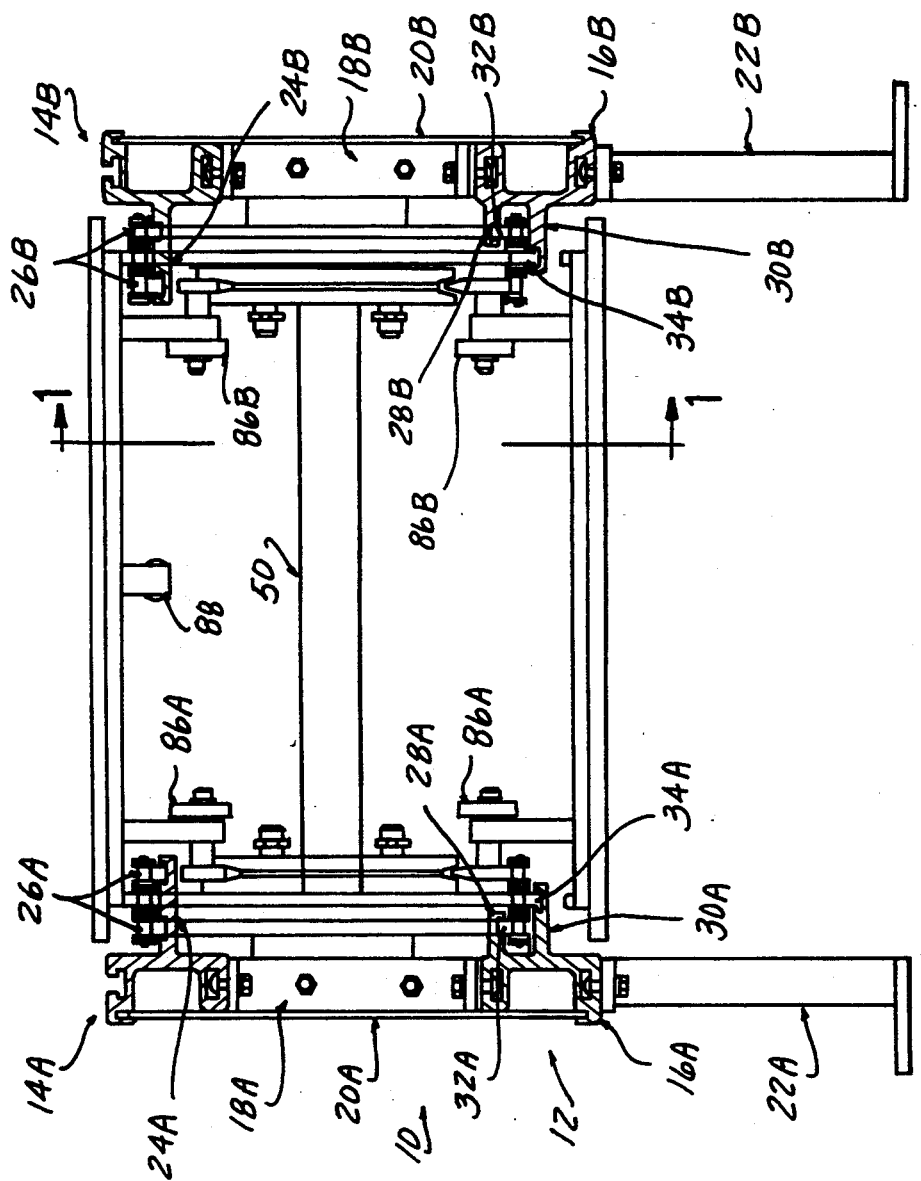
FIG. 2 is an end view from the advanced end of the conveyor shown in FIG. 1, showing advancing and returning pallets being driven along the upper and lower runs of the chain loops.
Figure 2A:
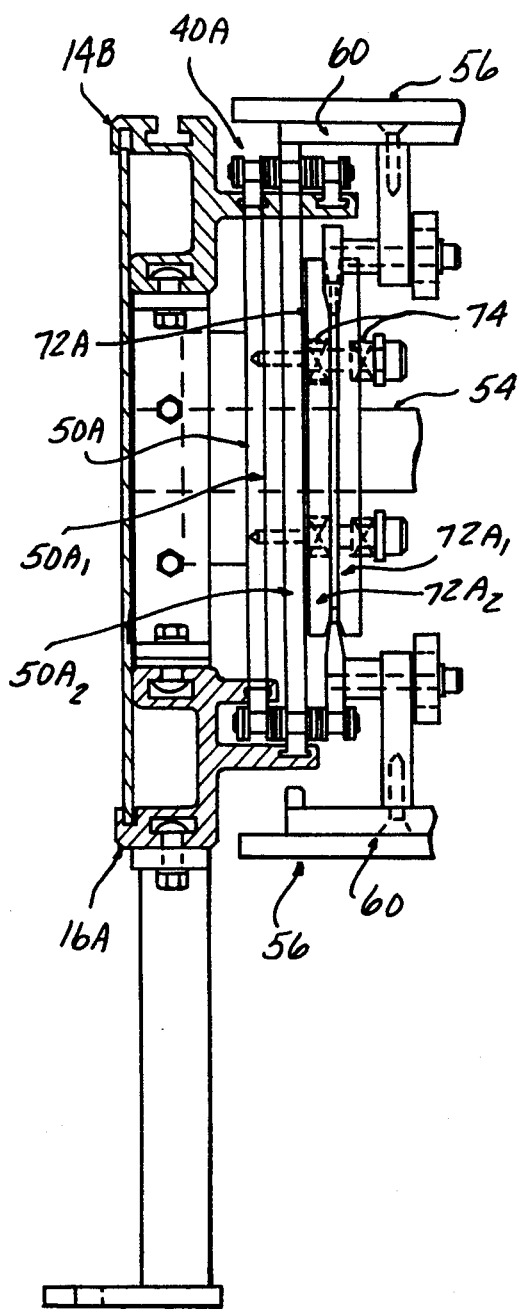
FIG. 2A and 2B show slightly enlarged end views taken from the return end of the conveyor shown in FIG. 1.
Figure 2B:
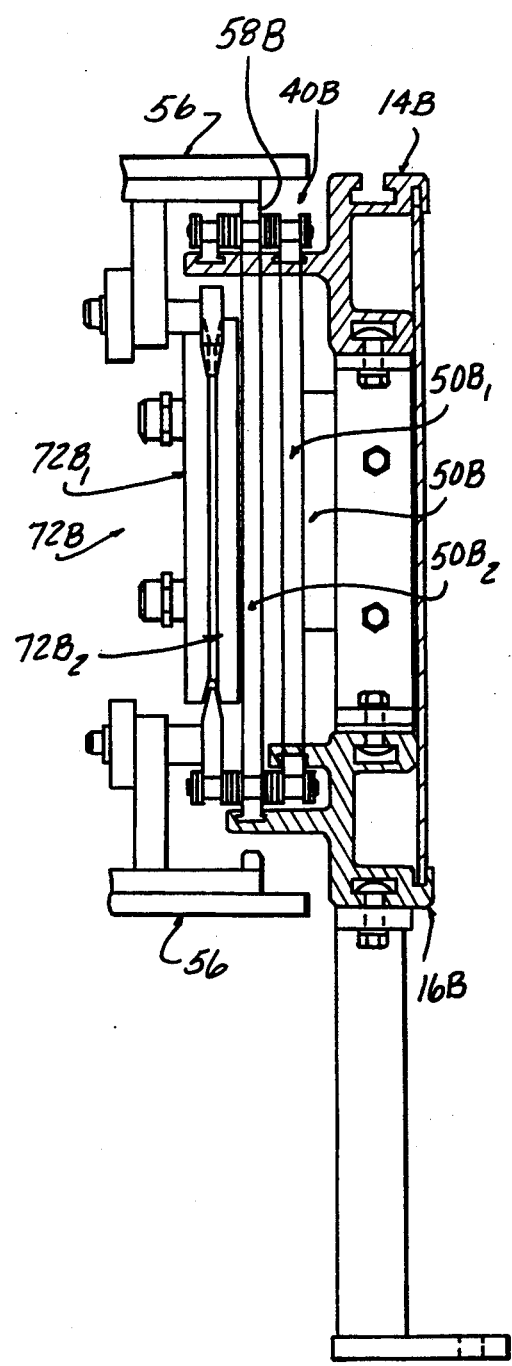

Referring to the drawings, FIGS. 1-3 illustrate a conveyor 10 according to the present invention, which includes an elongated conveyor framework best illustrated in FIG. 2, which comprises a spaced pair of longitudinally extending parallel upper side rails 14A, 14B and longitudinally extending parallel side rails 16A, 16B, each upper side rail 14A, 14B connected to a respective spaced below aligned lower side rail 16A, 16B, by means of brackets 18A, 18B.

Side panels 20A, 20B close off the space between the connected upper and lower rails 14A, 14B, 16A, and 16B, and are slipped into retaining grooves formed in the respective rails as shown.

Stanchions 22A, 22B support the connected rail assembly above the floor.

Each upper rail 14A, 14B includes projecting ledges 24A, 24B extending inwardly towards each other, each providing a ledge for a pair of spaced apart upwardly facing upper chain support bars 26A, 26B which support and guide the chain loops 40A, 40B along the advancing run of the conveyor.

Each lower rail 16A, 16B has an upper projecting ledge 28A, 28B and a longer lower projecting ledge 30A, 30B spaced vertically apart.

A downwardly facing first lower chain support bar 32A, 32B is fixed in each upper projecting ledge 28A, 28B, and an upwardly facing second lower chain support bar 34A, 34B is fixed in each lower projecting ledge 30A, 30B.

Opposing first and second lower chain support bars 32A, 34A, and 32B, 34B are offset axially a distance corresponding to the spacing of outer links 36A, 36B and middle links 38A, 38B of a pair of triple link chain loops 40A, 40B supported on the side of the upper and lower rails 14A, 14B and 16A, 16B of the conveyor framework 12.

The triple strand chain loops 40A, 40B also include inner links 42A, 42B in addition to the previously mentioned middle links 38A, 38B and outer links 36A, 36B. The chain loops 40A, 40B each extend along an upper advancing run, defined by upper chain support bars 26A, 26B.

During the upper advancing run, the chain loops 40A, 40B are supported on the inner links 42A, 42B and outer links 36A, 36B, riding the chain support bars 26A, 26B leaving the middle links 38A, 38B open for pallet support as will be described.

The chain loops 40A, 40B each pass around respective double sprockets 48A, 48B mounted on a shaft 50 to be rotatably mounted at the advance end of the conveyor frame 12 and double sprockets 52A, 52B mounted on a shaft 54 rotatably mounted at the opposite return end of the frame 12.

During the lower return run, the chain loops 40A, 40B are supported on the first and second lower chain support bars 32A, 32B, 34A, 34B. The outer links 36A, 36B are positioned below the second chain support bars 32A, 32B while the middle links 38A, 38B pass over the first lower chain support bars 34A, 34B. This creates a cantilevered support of the inner links 42A, 42B for return pallet support described below.

Each of the double sprockets 48A, 48B, 50A, 50B comprise separate sprocket wheels $48A_1$, $48A_2$, $48B_1$, $48B_2$, $50A_1$, $50A_2$, $50B_1$, $50B_2$ which engage the outer links 36A, 36B and middle links 38A, 38B, leaving the inner links 42A, 42B cantilevered after passing off the upper chain support bars 26A, 26B (see FIG. 3).

A series of pallets 56 are supported on the chain loops 40A, 40B to be frictionally driven along the upper advance and lower return runs of the conveyor. The pallets 56 each have a pair of wear bars 58A, 58B affixed beneath a planar platform 60 adapted to carry a workpiece (not shown) to be mounted on the pallet 56. The pairs of wear bars 58A, 58B are spaced to run on the center links 38A, 38B. The load of the workpiece W (FIG. 6) is thus symmetrically absorbed by the chain loops 40A, 40B without imposing any twisting or bending on the chain links.

A first and a second pallet return means are provided, each at a respective conveyor end to first swing the pallet down around the sprocket axis and be deposited onto the beginning end of the return run of the chain loops, and then to be swung up and deposited onto the beginning end of the advance run of the chain loops 40A, 40B.

In this embodiment, the pallet return means includes a pair of combined gripper-ride bars 62A, 62B located underneath either side of each pallet platform 60, mounted on a respective mounting plate 64A, 64B fixed with screws as shown.

The gripper-ride bars 62A, 62B are spaced below the platform 60 and spaced outwardly from the mounting plates 64A by spacers 66A, 66B so as to be aligned but spaced below respective inner links 42A, 42B.

The gripper-ride bars 62A, 62B each have a gripper bar portion 68A, 68B formed with tapered sides, located at the bottom when the pallet 56 is riding atop the advancing run of the chain loops 40A, 40B. Pairs of first and second split disc gripper mechanisms 70A, 70B and 72A, 72B are located each end of the conveyor 10, gripper mechanism 70A, 72A aligned with gripper bar portion 68A and gripper mechanisms 70B, 72B aligned with gripper bar portion 68B. Each gripper mechanism is comprised of a disc assembly comprised of a pair of facing discs $70A_1$, $70A_2$, $70B_1$, $70B_2$, and $72A_1$, $72A_2$, $72B_1$, $72B_2$ aligned with respective sprockets. The tapered side gripper bar portions 68A, 68B are configured to be fit between each pair of discs $70A_1$, $70A_2$, $70B_1$, $70B_2$, $72A_1$, $72A_2$, $72B_1$, $72B_2$, each disc having a perimeter chamfer surface which face each other to together form a gripper bar taper matching perimeter groove 92. The split disc gripper mechanisms 72A, 72B, 70A, 70B are of smaller diameter than the double sprockets 48A, 48B, 50A, 50B to allow the gripper-ride bars 62A, 62B to be located spaced below the inner links 42A, 42B as the pallets 56 move to the end of the advance run.

Each gripper bar portion 68A, 68B tapered shape is slightly wider than the split disc mating groove so that the pairs of discs are spread apart against a spring bias.

The discs $70A_1$, $70A_2$, $70B_1$, $70B_2$ and $72A_1$, $72A_2$, $72B_1$, $72B_2$ are each aligned with and rotationally fixed with respect to the respective double sprockets 48A, 48B, 52A, 52B, but are mounted for limited axial spreading movement by means of bolts 76, springs 74 the spreading movement resisted by interposed compression springs 74.

As previously mentioned, the split disc gripper mechanisms 70A, 70B are aligned with the inner links 42A, 42B and the gripper bar portions 68A, 68B so that as each pallet 56 moves to the end of the upper advancing chain loop run, the tapered gripper bar portions 68A, 68B move into the perimeter groove 92 between the disc pairs $70A_1$, $70A_2$, and $70B_1$, $70B_2$.

This limited spreading establishes a frictional grip by the disc assembly 70A, 70B, causing the pallet 56 to be swung around the disc and sprocket axis by rotation of the split disc gripper mechanisms 70A, 70B.

Figure 4:
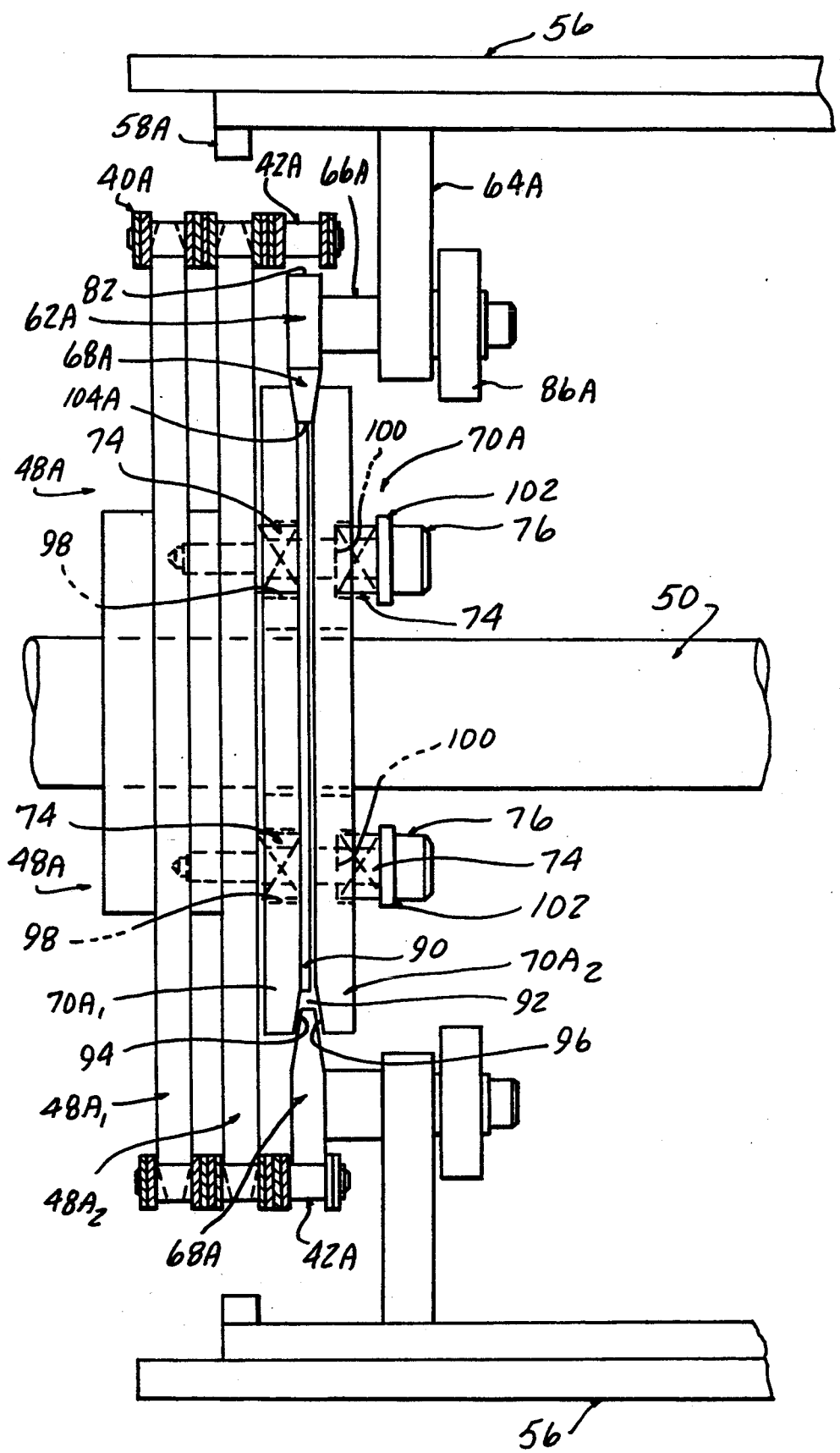
FIG. 4 is an enlarged fragmentary end view of one side of the conveyor shown in FIG. 1, with a pallet fully seated on the split discs of the gripper mechanism.

FIG. 4 more clearly shows further details of one of the split disc gripper mechanisms 70A, the other gripper mechanisms 70B, 72A, 72B being identical.

Each of the bolts 76 pass through both discs $70A_1$, $70A_2$, and has a threaded end received in the adjacent sprocket wheel $48A_2$.

Disc $70A_1$ is formed with an axially projecting reduced diameter portion 90 lying at the bottom of the perimeter groove 92 formed by facing chamfered surfaces 94, 96 of the discs $70A_1$, $70A_2$.

The compression springs 74 each surround the body portion of an associated bolt 76, and are received in pockets 98, 100 of the respective discs $70A_1$. The spring 74 in pockets 98 react against sprocket wheel $48A_2$, to push disc $70A_1$ to the right, spring 74 in pockets 100 reacting against a washer 102 on each bolt 76 to push drive disc $70A_2$ to the left. The discs $70A_1$, $70A_2$ abut each other when not engaged with a gripper bar portion 68A in a fully contracted condition.

The width of the tapered gripper bar portion 68A is wider than the perimeter groove 92 so that the discs 70A$_1$, 70A$_2$, are spread apart as the bottom 104A of the gripper bar portion 68A seats on the reduced diameter portion 90.

This engagement thus establishes a frictional connection between the flanks of the tapered gripper bar portion 68A and the chamfered surfaces 94, 96 of the discs 70A$_1$, 70A$_2$.

These elements do not become locked together since seating on the reduced diameter portion limits the spreading apart of the discs 70A$_1$, 70A$_2$, and also locates the bottom 104A of the gripper bar portion at a predetermined radial location.

The lower gripper portions 68A, 68B have inclined corners 108A, 108B to facilitate gradual lifting as the discs 70A$_1$, 70A$_2$ 72A$_1$, 72A$_2$ are encountered.

FIGS. 5A–5E illustrates diagrammatically the engagement of the pallet gripper bar portion 68A with the advanced end gripper mechanisms 70A.

Figure 5A:
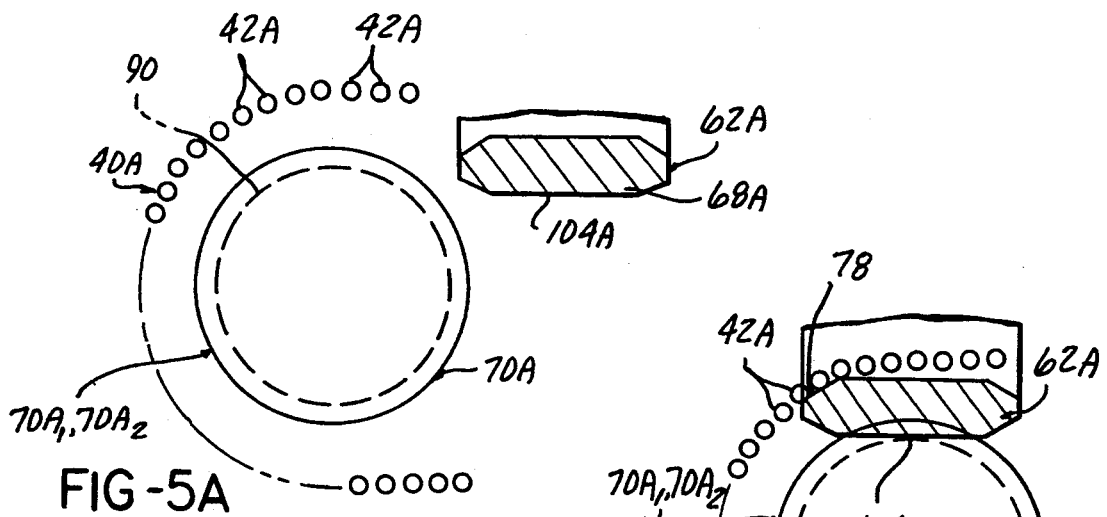
FIGS. 5A–5E are diagrammatic views depicting the progressive stages of engagement of a gripper-rider bar with the gripper mechanism discs and the inside link chain roller as a pallet is driven around the advanced end sprocket axis.

In FIG. 5A, a pallet approaches the advanced end split disc gripper mechanism 70A, with the bottom 104A of the gripper bar portion 68A lower than the highest level of the reduced diameter portion 90.

Figure 5D:
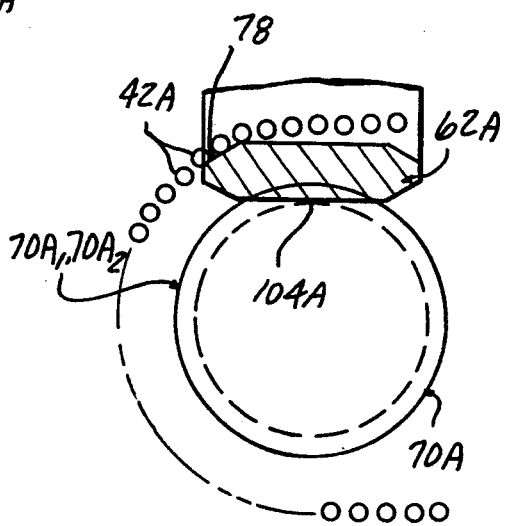
Figure 5B:
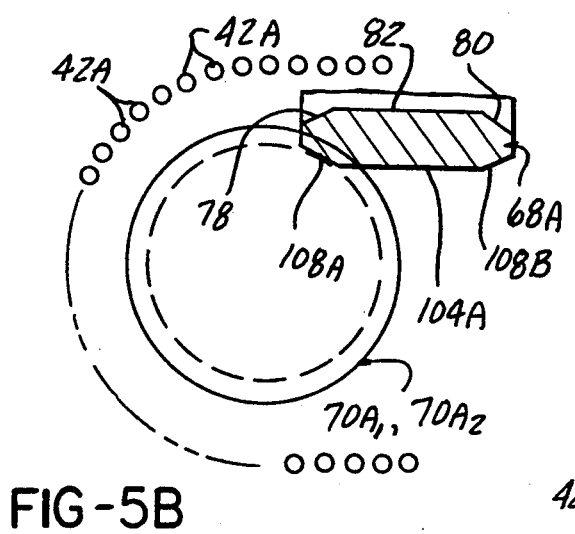
Figure 5E:
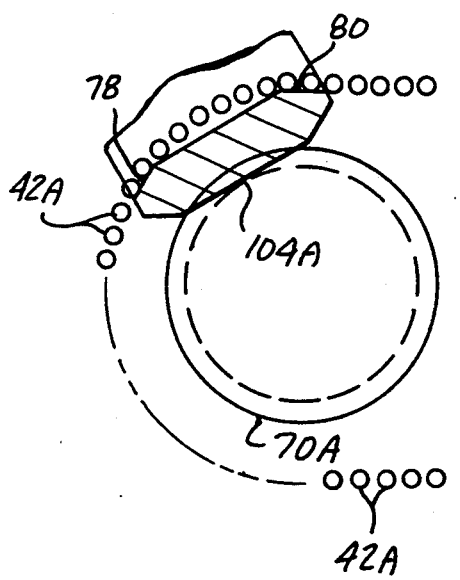

In FIG. 5B, the gripper bar portion 68A has been moved between discs 70A$_1$, 70A$_2$ to establish a frictional grip.

The gripper-ride bars 62A, 62B are elongated and formed with shoulders 78 and 80 at the respective leading and trailing ends thereof, located on the top edge of the gripper-ride bars 62A, 62B when the pallets 56 are on the upper advancing run of the chain loops 40A, 40B.

Figure 5C:
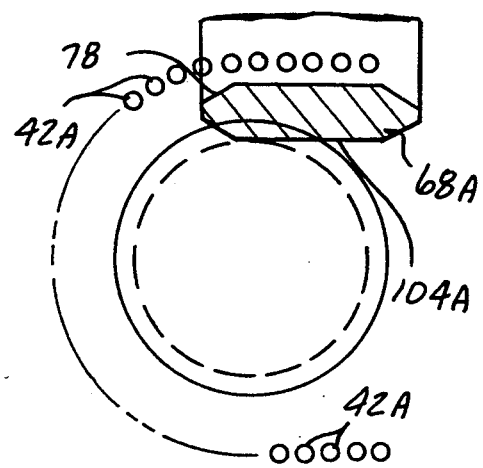

As the pallet 56 is rotated forward, the pallet 56 moves forward and up slightly as indicated in FIGS. 5C, 5D, and the gripper bar portion 68A is advanced to bring the leading shoulder 78 into engagement with the inside of the roller portions of the aligned inner links 42A.

As rotation continues, the pallet 56 is tilted bringing the trailing shoulder 80 against the rollers of the aligned inner links 42A, extending the gripper-ride bar 62A chordally across the chain curvature established by the chain loops passing around the sprocket wheels.

The pallet 56 is thus guided to be held normal to the sprocket axis by the shoulders 78, 80 of the ride bar being positioned against the inside radius of the chain loops as they pass around the sprocket axes. A three point engagement is established by the contact of the middle of bottom surface 104A of the gripper bar portions on reduced diameter portion 90 and ride bar shoulders 78, 80 contacting the rollers of the inner chain links 42A, 42B as the chain loops curve around the sprocket perimeters. Thus, the pallet 56 is held in a position normal to the sprocket axis as it is swung about to be inverted by rotation of the split disc gripper mechanisms 70A, 70B.

Only the friction grip of the gripper mechanisms restrains the pallets 56 from moving about each sprocket axis, as the rounded shoulders 78, 80 could roll about the inside of the chain sections on the sprockets. Thus, a pallet encounters an obstruction, slippage can occur.

As pallet 56 reaches an inverted position, the grip of the discs 70A$_1$, 70A$_2$, and 70B$_1$, 70B$_2$ is overcome by the weight of the pallet 56, these discs 70A, 70B rotating up and off the tapered gripper portions 68A, 68B. The now bottom located edge 82 of the gripper- ride bars 62A, 62B comes to rest atop the cantilevered inner links 42A, 42B of the respective chain loops 40A, 40B.

The pallets 56 thus will now return inverted, supported by the edges 82 of the gripper ride bars 62A, 62B resting on the cantilevered inner links 42A, 42B of the chain loops 40A, 40B.

At the return end of the conveyor 10 the reverse happens. The leading end of the now inverted tapered gripper bar portions 68A, 68B encounter the split gripper mechanisms 72A, 72B which grip the same. As the pallet 56 is moved up, the leading shoulders 78 contact the inner links 42A, 42B, and subsequently the trailing shoulders 80, establishing a secure guiding of the chain loops 40A, 40B as the pallet 56 is swung upwardly by rotation of the split disc gripper mechanisms 72A, 72B until reaching the upper advancing run, with wear bars 58 again seating on middle links 38A, 38B. The grip of the gripper mechanisms 72A, 72B is overcome as the disc assemblies 72A, 72B rotate down and away to be stripped from the gripper ride bars 62A, 62B which again are spaced below the inner links 42A, 42B as the pallet 56 moves down atop the chain loop center links 38A, 38B.

The pallets 56 are easily linked together into subgroups by pairs of elements such as link bars 86A, 86B connected at either end to the trailing and leading ends of successive pallets 56 by a pivotal connection to the mounting plates 64A, 64B allowing relative tipping.

Figure 6:
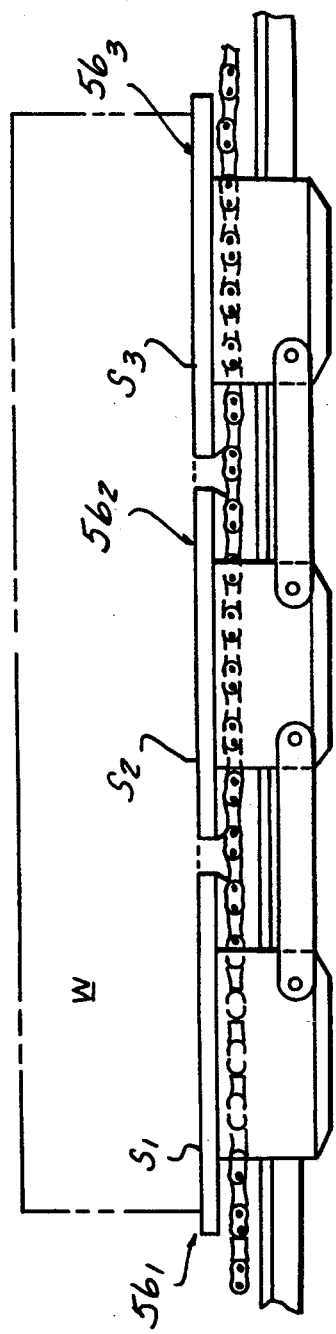
FIG. 6 is a fragmentary side elevational view of a linked subgroup of pallets with a phantom representation of a workpiece spanning the length of the group of pallets.

As seen in FIG. 6, a relatively long length workpiece W can be supported by the combined lengths of the work supporting horizontal surfaces S$_1$, S$_2$, S$_3$, of the pallets linked into a subgroup. At the same time, this subgrouping of pallets 56 can pass around the curved ends because of the relative tipping allowed by the linked connection.

The spacing of linked pallets 56 in each subgroup need not be exactly controlled as in the arrangement of the prior application, since the engagement points with the gripper mechanisms 70A, 70B, 72A, 72B is not fixed by the location of particular features, such as the roller pockets shown therein. The links 86A, 86B simply pivot to extend across chordally across the disc assemblies to the next ahead pallet 56 as both pallets 56 are swung around the disc axis.

Likewise, a control arrangement for exactly coordinating the encounter of the pallets with the disc rotational position is not required, making the present arrangement simpler and more reliable than the previously described embodiment.

The pallets 56 may be equipped with bumpers 88 at the center, since pallet accumulating may occur at the sprockets or elsewhere in the system, as is well known.

Figure 7:
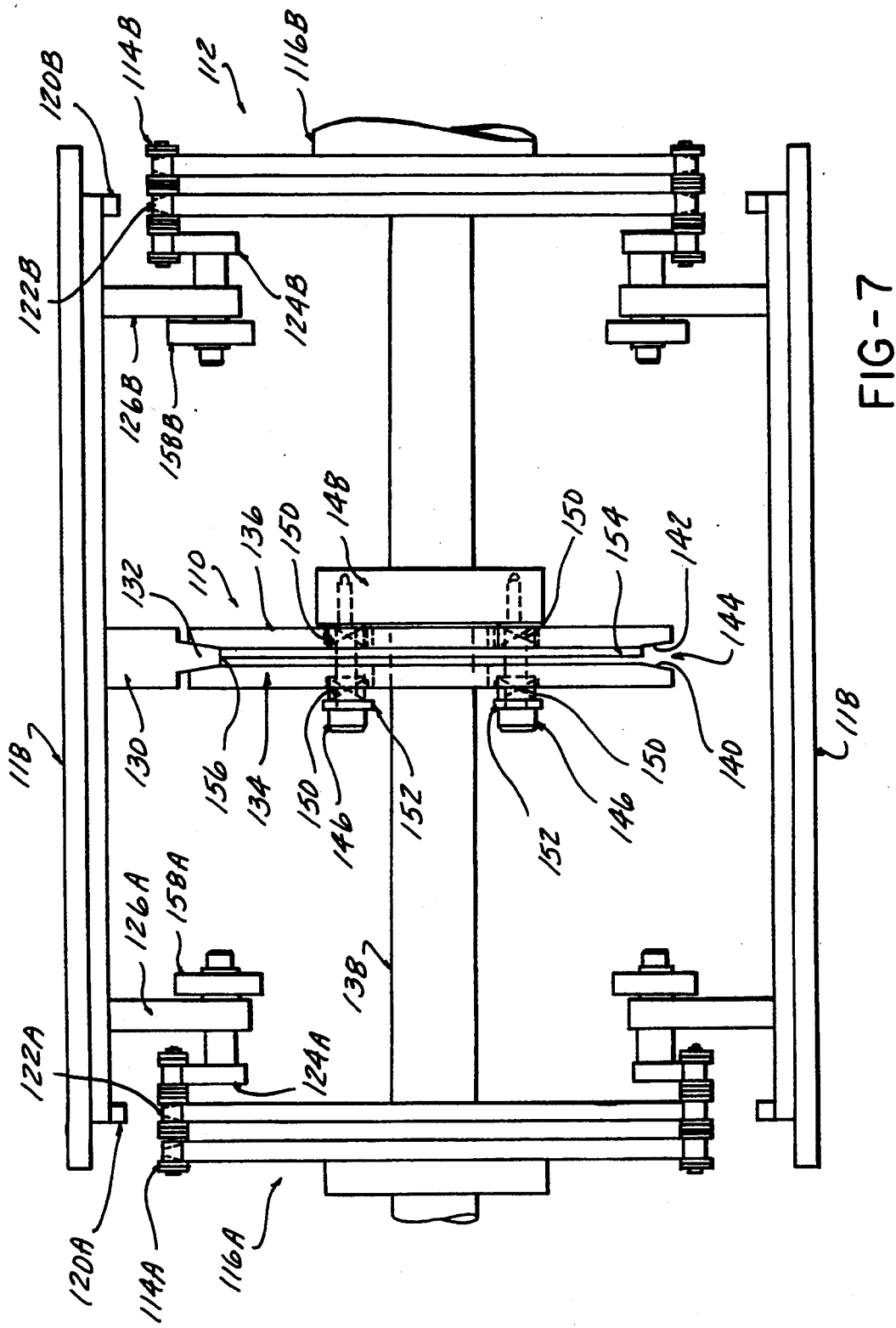
FIG. 7 is an end view of an alternate embodiment of the conveyor according the invention.

Referring to FIG. 7, an alternate form of the conveyor according to the invention is shown, using a single split disc gripper mechanism 110 at each end of the conveyor 112, centered in the space between the conveyor chain loops 114A, 114B, supported on a conveyor frame (not shown) in similar fashion to the above described embodiment.

A double sprocket 116A, 116B drives a respective chain loop 114A, 114B in the same manner as before.

The pallets 118 each have wear bars 120A, 120B aligned with the center links 122A, 122B of the respective chain loops 114A, 114B and resting on the same prior to engagement with the gripping mechanism 110 at the advanced end of the conveyor 112.

The pallets 118 are provided with a pair of ride bars 124A, 124B each mounted on either side and spaced below the underside of the pallets 118 by mounting plates 126A, 126B.

A central gripper bar 130 is affixed to the center of the underside of the pallet 118, having a tapered lower edge 132 aligned with the central split disc gripper mechanisms 110.

The central gripper mechanism 110 is comprised of an assembly of a pair of facing discs 134, 136 each received over and rotated by a sprocket shaft 138.

Each disc has a perimeter chamfer surface 140, 142 facing each other to define a tapered perimeter groove 144.

The discs 134, 136 are slidably mounted on a series of capscrews 146 having threaded ends received in a flange 148 fixed on the shaft 138.

Compression springs are 150 disposed in respective pockets and encircle the capscrews 146 and react against washers 152 and flange 148 to urge the discs 134, 136 together in similar fashion to the previously described embodiment.

A reduced diameter portion 154 is formed on disc 136 so that the bottom edge of tapered portion 156 comes to rest after a predetermined extent of spreading of the discs 134, 136.

Successive pallets 118 may be connected with link bars 158A, 158B as before.

This embodiment functions as the above described embodiment, except that the gripping friction force is less, as only a single pair of discs is involved. The rider bars 124A, 124B are separate elements from the gripper bar 130, only a single gripper bar required.

Thus, the conveyor is adapted to provide workpiece support surfaces of any reasonable length, by linking the pallets together, yet they are able to be returned by being driven around the sprockets at each end.

Positive connections to the chains are not involved at any stage in the driving of the pallets.

Figure 9:
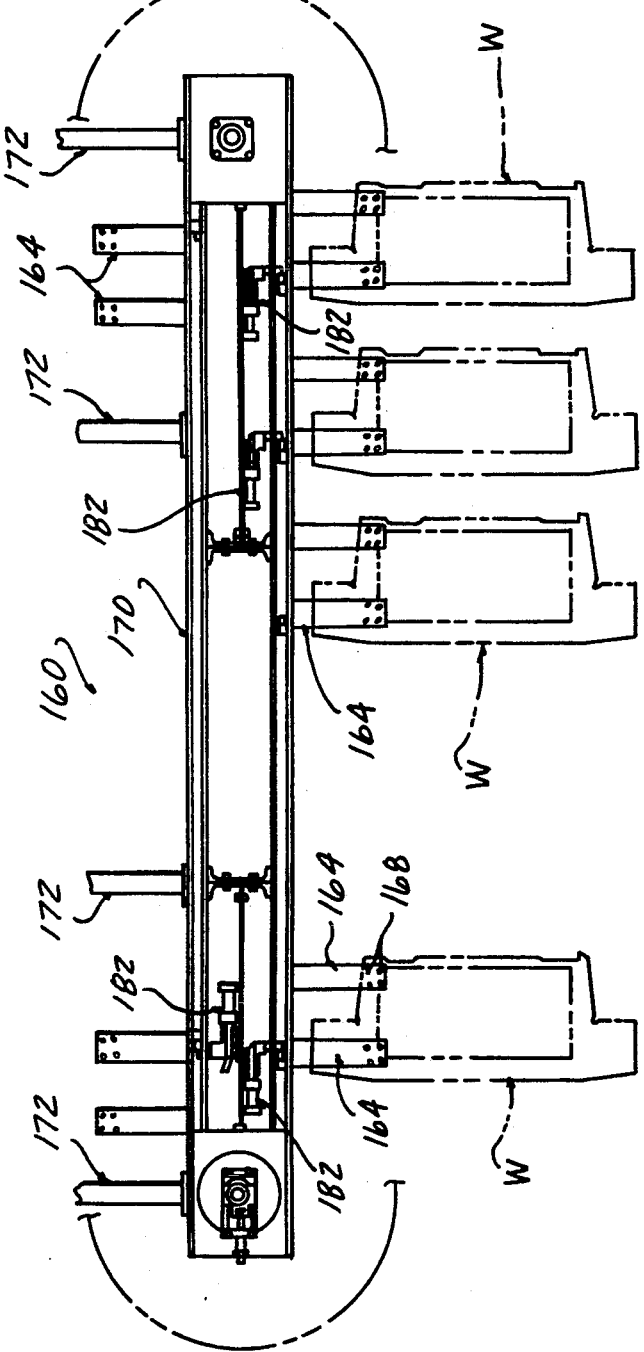
FIG. 9 is a side elevational view of the overhead conveyor embodiment shown in FIG. 8.
Figure 8:
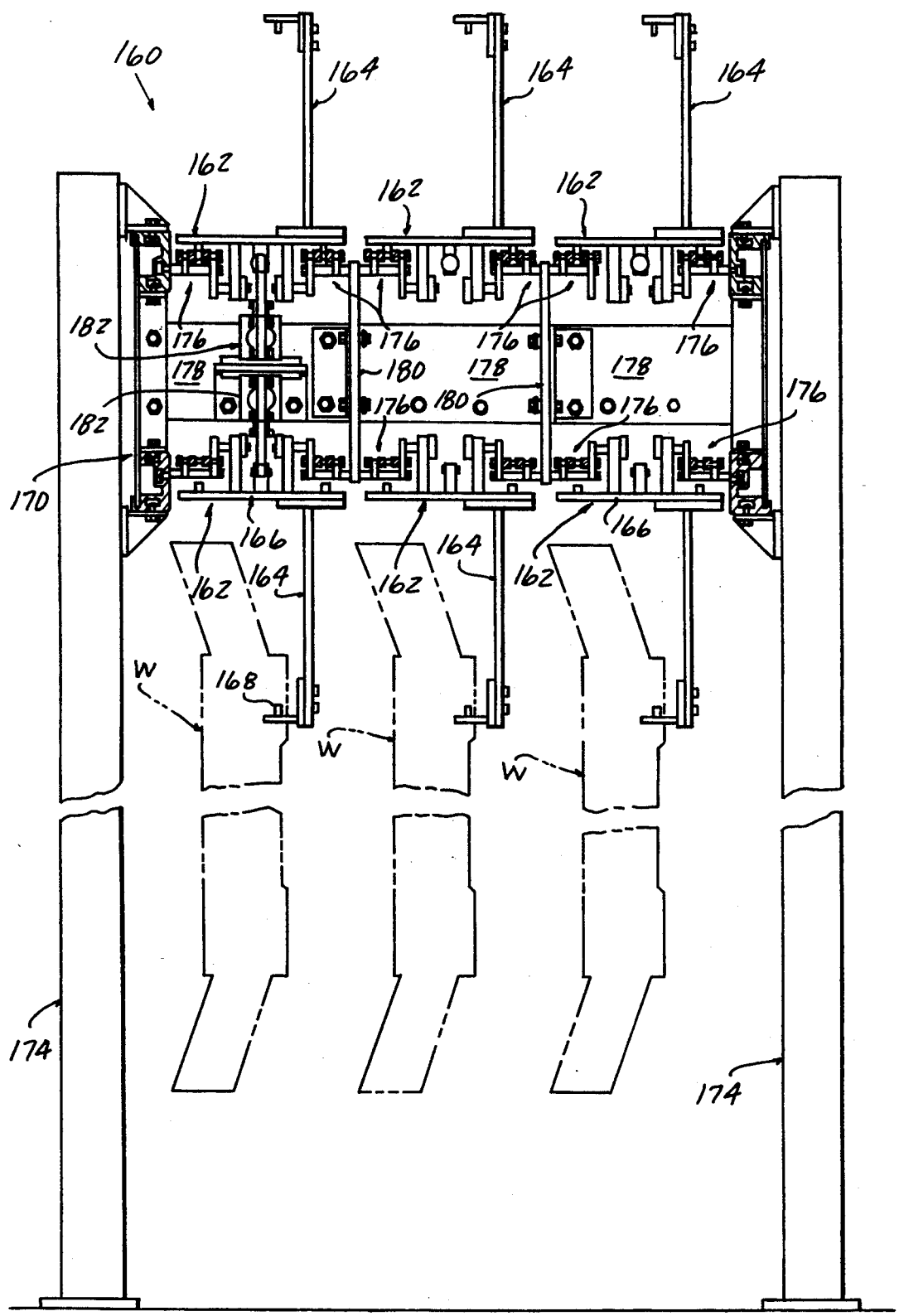
FIG. 8 is an endwise view of an alternate overhead form of the conveyor according to the invention.

Referring to FIGS. 8 and 9, an overhead conveyor 160 is shown incorporating many of the features of the conveyors described above.

In this embodiment, workpieces W are adapted to be suspended from the inverted pallets 162 during their movement along the lower run, i.e., the return run becomes the upper run. This is enabled by hangers 164 attached to the support plate 166 of each pallet 162 to project therefrom, with suitable fingers 168 attached to the hangers 14 engaging the workpieces W.

In this instance, the pallets 162 are coupled in pairs to create spaced points of support for the workpieces W, as shown in FIG. 9.

The conveyor frame 170 is adapted to also be suspended overhead by hanger bars 172 or optionally by long length floor supports 174 of sufficient length to allow the long length workpieces W to clear the floor.

A multilane array of conveyor tracks 176 is supported on the frame 170 to enable side-by-side series of workpieces W to be transported as can be seen in FIG. 8. Cross pieces 178 support the necessary lengthwise intermediate members 180.

Suitable pneumatic cylinder operated stop mechanisms 182 allow the movement of the pallets 162 to be controllably arrested for loading and unloading purposes. Such stop mechanisms 182 will normally be provided for each lane although only one lane is shown in FIG. 8.

Accordingly, the pallets 162 are loaded when proceeding along the lower run, and unloaded when proceeding back the upper run, the hangers 164 swing around to be inverted as shown.

I claim:

1. A chain conveyor comprising:
   an elongated conveyor frame;
   a pair of side-by-side aligned conveyor chain loops mounted extending along each side of said conveyor frame, each chain loop received over respective aligned pairs of sprockets at either end of said conveyor, said sprockets each being rotationally mounted and at least one of said pairs of sprockets adapted to be power driven to advance said chain loops in respective endless paths about said conveyor;
   each chain loop including an upper run circulated along an upper portion of said conveyor frame and a lower run circulated along a bottom portion thereof;
   a series of pallets having portions frictionally engaged by said conveyor chain loops along said upper and lower runs to be conveyed thereby along said upper and lower runs;
   first pallet return means at the end of said upper run causing each of said pallets to be swung down about the axis of rotation of said sprocket pairs there located and deposited inverted on said lower run of said chain loops, and a second pallet return means at the end of said lower run causing each pallet to be swung up about the axis of rotation of said pair of sprockets there located and deposited upright on said upper run of said chain loops;
   linking means linking two or more of said pallets together into a subgroup for travel together down said upper and lower runs of said chain loops, said linking means allowing said pallets to tip relative each other during movement around said sprocket axes caused by said first and second pallet return means at respective ends of said conveyor;
   said two or more linked pallets together defining a combined workpiece support of substantially greater horizontal length than the length of a workpiece support of a single pallet, whereby workpieces of longer horizontal length than a single pallet can be supported thereon.

2. The conveyor according to claim 1 wherein said linking means comprises at least one elongated link element pivotally connected at either end to respective adjacent trailing and leading portions of linked pallets.

3. The conveyor according to claim 1 wherein said linking means comprises a pair of elongated link bars both pivotally connected at each end to respective adjacent leading and trailing portions on each side of linked pallets.

4. The conveyor according to claim 1 wherein said first and second pallet return means includes first and second rotary frictional gripper means each located at a respective end of said conveyor, each rotatable about the axis of rotation of said sprocket pairs at said end and acting to engage and frictionally grip a portion of each pallet moving to the end of said upper and lower runs respectively and swing said gripped pallet around said respective sprocket axis.

5. The conveyor according to claim 4 further including guide means maintaining each of said pallets in an orientation normal to the sprocket axis as said first and second gripper means swings said pallet about said respective sprocket axis.

6. The conveyor according to claim 5 wherein said first and second gripper means each comprises a circular member having a tapering perimeter groove, each of said pallets having a tapered edge gripper bar aligned with said rotary element and adapted to move into said groove at the end of said upper run and lower run respectively, said gripper bar thereby frictionally engaged to be swung by said circular member.

7. The conveyor according to claim 6 wherein said circular member of each of said first and second gripper means comprises an assembly of two aligned discs, each having a perimeter chamfered surface facing the other to define said tapering groove.

8. The conveyor according to claim 7 wherein said discs are mounted to be able to be spread apart, and a plurality of springs urging said discs together, said gripper bar spreading said discs apart to be gripped by the force exerted by said springs.

9. The conveyor according to claim 8 wherein at least one of said discs is formed with an axial projecting reduced diameter portion, said gripper bar tapered edge having an axially extending surface seating on said reduced diameter portion after a predetermined extent of spreading of said discs to limit the spreading of said discs.

10. The conveyor according to claim 5 wherein said guide means includes a pair of spaced elongated ride bars mounted beneath each of said pallets and aligned beneath a respective chain loop, a rounded shoulder at either end of each ride bar moving into engagement with curved segments of said chain so that said ride bar extends chordally across said curved segment as said pallet is swung about each sprocket axis by said frictional gripper means.

11. The conveyor according to claim 8 wherein first and second pairs of assemblies of discs are located at each end of said conveyor, each assembly of discs in each pair adjacent a respective sprocket, each of said pallets having a pair of gripper bars each gripper mounted on one side of each of said pallets aligned with a respective assembly of discs to move into engagement therewith.

12. The conveyor according to claim 10 wherein each of said chain loops comprise triple link chains and each of said sprockets comprise double sprocket wheels engaging an outer two of said chain links and cantilevering the inside link, and wherein said ride bar shoulders engage said cantilevered inside links.

13. The chain conveyor according to claim 1 further including a hanger bar projecting from each pallet to depend therefrom when on said lower run to enable suspending of a workpiece thereby transported during movement of said pallet along said lower run.

* * * * *